United States Patent [19]

Abe

[11] Patent Number: 4,772,302

[45] Date of Patent: Sep. 20, 1988

[54] OPTICAL WAVEGUIDE MANUFACTURE

[75] Inventor: Koichi Abe, Ottawa, Canada

[73] Assignee: Northern Telecom Limited, Montreal, Canada

[21] Appl. No.: 12,328

[22] Filed: Feb. 9, 1987

Related U.S. Application Data

[62] Division of Ser. No. 745,779, Jun. 17, 1985, abandoned.

[30] Foreign Application Priority Data

Dec. 21, 1984 [CH] Switzerland ............ 470963

[51] Int. Cl.$^4$ ............... C03B 37/018; C03B 37/014
[52] U.S. Cl. .......................... 65/3.12; 65/3.11; 65/DIG. 16; 65/900
[58] Field of Search ............ 65/3.11, 3.12, 18.2, 65/DIG. 16, 900

[56] References Cited

U.S. PATENT DOCUMENTS

| | | | |
|---|---|---|---|
| 822,424 | 6/1906 | Bottomley | 65/18.2 |
| 2,364,526 | 12/1944 | Hansell | 219/10.55 |
| 3,553,413 | 1/1971 | Soulier | 219/10.55 |
| 3,933,454 | 1/1976 | Deluca | 65/18.2 |
| 4,586,943 | 5/1986 | Kyoto | 65/DIG. 16 |
| 4,629,485 | 12/1986 | Berkey | 65/DIG. 16 |
| 4,643,751 | 2/1987 | Abe | 65/DIG. 16 |

FOREIGN PATENT DOCUMENTS

| | | | |
|---|---|---|---|
| 2428618 | 2/1980 | France | 65/DIG. 16 |
| 5447666 | 4/1979 | Japan | 65/3.12 |

Primary Examiner—Kenneth M. Schor
Attorney, Agent, or Firm—Foley & Lardner, Schwartz, Jeffery, Schwaab, Mack, Blumenthal & Evans

[57] ABSTRACT

Optical waveguide having a fused silica core and a fluorine doped silica cladding is made by heating a cylinder of silica in fluorine, the cylinder initially having an outer annular particulate or porous region which is dried by the fluorine and into which fluorine diffuses to lower the refractive index of the silica when fused. The cylinder is made by depositing particulate silica onto a mandrel, drying the silica in chlorine, and heating the silica to densify it. Further particulate silica is deposited and is then heated in a fluorine-containing gas to dry, fluorine diffuse, and sinter the porous outer part of the silica. The resulting tubular silica preform is heated to collapse the tubular preform into a rod from which optical waveguide is drawn, the waveguide having a fluorine doped silica cladding. In one alternative the silica cylinder is made by depositing onto a mandrel a first layer of relatively dense silica followed by a second layer of less dense particulate silica so that fluorine diffuses preferentially into the lower density material. In another alternative, the silica cylinder is made by depositing particulate silica directly onto a high purity fused silica rod without using a mandrel, the deposited silica then being dried and subjected to fluorine diffusion.

4 Claims, 2 Drawing Sheets

OPTICAL WAVEGUIDE MANUFACTURE

This is a division, of application Ser. No. 745,779, filed June 17, 1985, now abandoned.

The invention relates to a method for manufacturing optical waveguide. It has particular application to the manufacture of optical waveguide having a fluorine doped silica cladding and a pure or doped silica core.

Optical waveguide having a pure silica core and a fluorine doped silica cladding is described in U.S. Pat. No. 4,082,420 (Shiraishi et al). The optical waveguide is made by a flame hydrolysis method in which silicon tetrachloride and silicon tetrafluoride are fed to an oxygen-hydrogen burner to form a flourine doped silica soot which is deposited onto the surface of a vitreous silica rod. The rod and deposited soot are then heated to consolidate the soot into a composite glass preform and fiber is drawn from the preform.

Using the flame hydrolysis method, it has proven difficult to entrain sufficient fluorine into the deposited silica. The fluorine lowers the refractive index of the silica but the dopant content in the cladding must be sufficient to lower the refractive index of silica from about 1.4585, being that of pure silica, to about 1.4550 or less in order that a fiber having a pure silica core and a doped silica cladding will function as a waveguide.

Our copending Canadian Patent Application Ser. No. 463,378, filed Sept. 17, 1984 describes an alternative method of fabricating a fluorine doped silica clad fiber. In the method two cylindrical porous silica preforms are made with dimensions such that one preform will fix axially inside the other. The porous preforms are dried and the larger preform is heated in a fluorine containing atmosphere to introduce a fluorine dopant into it. The smaller preform is then placed inside the larger preform and the two preforms are further dried in, for example, chlorine gas and then heated to consolidate and collapse the porous material of the preforms into a transparent fused silica rod. The composite preform obtained is heated and optical waveguide drawn from it, the waveguide having a pure silica core derived from the smaller preform and a fluorine doped silica cladding derived from the larger preform.

A problem in implementing this method is that when heating to consolidate the porous silica and to collapse the larger porous preform onto the smaller preform, fluorine is released from the outer tube and penetrates into the inner preform thereby undesirably lowering the refractive index of the inner preform.

To avoid this problem there is proposed according to one aspect of the invention a method of manufacturing optical waveguide comprising forming a layer of particulate silica on a cylindrical silica substrate, diffusing fluorine into the porous silica layer, heating the silica to cause consolidation and collapse of the silica into a fused rod preform, heating the rod preform to a drawing temperature and, drawing optical waveguide from the rod preform, such waveguide having a cladding part derived from the deposited particulate silica layer and a core part derived from the substrate silica.

The silica substrate can be prepared by depositing particulate silica onto a cylindrical mandrel, drying the particulate silica and then fusing or densifying the silica. The initially deposited silica is thereby rendered sufficiently dense that when subsequently deposited particulate silica is subjected to fluorine diffusion, either fluorine does not diffuse into the initially deposited silica or it diffuses preferentially into the subsequently deposited silica. The deposited silica forms a tubular preform which is removed from the mandrel at some stage prior to collapsing the silica tube into the fused rod preform.

In an alternative method a relatively dense layer of particulate silica is initially deposited onto the mandrel and is followed by a less dense layer of particulate silica, the relative densities being such that fluorine diffuses readily into the outer layer in comparison to the inner layer.

In a further alternative, the preform is prepared by depositing a thick layer of particulate silica onto a mandrel, drying the silica and then densifying an inner region of the deposited silica before fluorine diffusion takes place. The inner region can, for example, be RF heated using a carbon mandrel as a susceptor.

In yet another alternative, the preform is prepared without the use of a mandrel. A fused silica rod is prepared by, for example, fabricating a rod of porous silica, drying and heating the rod to consolidate it into a fused silica rod. Particulate silica is then deposited directly onto the rod and is dried and subjected to fluorine diffusion before consolidation and drawing into fiber.

The particulate silica is preferably produced by a flame hydrolysis action in which silicon tetrachloride dissociates in an oxygen-hydrogen burner flame.

Particulate silica which is to function as core material in the drawn optical waveguide is preferably dried in a chlorine containing atmosphere. In the drying step, chlorine is preferably mixed with helium, a drying chamber being maintained at a temperature of the order of 1300 degrees centigrade.

Similarly, particulate silica which eventually is to function as fiber cladding can also be dried in chlorine before being subjected to the fluorine diffusion step. Alternatively, it is dried in a fluorine atmosphere whereby it is simultaneously subjected to the drying and fluorine diffusion steps. In the flouroine diffusion step, the fluorine containing gas, for example sulphur hexafluoride or silicon tetrafluoride, is mixed with helium in an amount dependent on the refractive index value required of the fused silica finally obtained. The silica densification, chlorine drying and fluorine drying/diffusion steps can be performed in a furnace tube through which appropriate gases are directed. The preform remains in the tube during these steps so minimizing the chance of contamination.

Embodiments of the invention will now be described, by way of example, with reference to the accompanying drawings in which.

Figure 1:
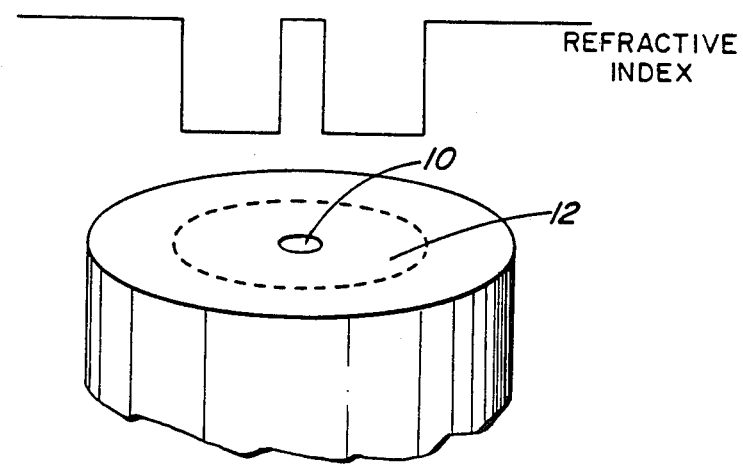
FIG. 1 shows the end part of an optical waveguide made by a method according to the invention, the Figure also illustrating a refractive index profile across the fiber.

Referring to FIG. 1, a single mode optical fiber has a core 10 of high purity fused silica and an outer cladding 12 of fluorine doped silica. The optical fiber has an outer diameter of 125 microns and a core diameter of 9 microns for single mode fiber and about 50 microns for multimode fiber. The fluorine is present in a sufficient amount that the refractive index of the cladding region is 1.4550 or less compared to 1.4585 for the core region.

To make a fiber having the structure and composition shown in FIG. 1, a cylindrical preform is made from particulate silica. The preform is dried and fluorine is diffused into an outer porous region of the preform. The preform is then consolidated into a fused silica rod from which fiber is drawn, the fiber having a relatively low refractive index cladding corresponding to the fluorine doped region.

There are several possible implementations of this basic sequence.

Referring particularly to FIGS. 2 to 6, FIG. 2 shows a graphite mandrel 14, 50 centimeters in length and 5 millimeters in diameter. The end of a quartz tube 16 is slid over one end of the mandrel and the tube and remote mandrel end are fixed into spaced chucks 17 of a lathe. A silica soot producing burner 18 is mounted to direct a flame at the mandrel 14. Silicon tetrachloride entrained within a stream of oxygen by bubbling the oxygen through the silicon tetrachloride is fed to a central tubular chamber within the burner 18. Argon, which separates the silicon tetrachloride vapour from the burner gases within the burner itself is fed to a second surrounding annular chamber, hydrogen to a third annular chamber, and a mixture of argon and oxygen is fed to an outer burner chamber. The flow rates are 2 to 3 liters per minute of oxygen to the first chamber, 2 liters per minute of argon to the second chamber, 10 liters per minute of hydrogen to the third chamber and 15 liters per minute of argon with 3 liters per minute of oxygen to the outer chamber. The burner is moved along the length of the rod at 8 centimeters per minute and the mandrel 14 is rotated at 30 revolutions per minute.

Silica soot is deposited onto the mandrel with a rate of growth which depends on the diameter of the mandrel as supplemented by previously deposited particulate silica. Silica is deposited onto the mandrel to a diameter of 1.2 centimeters and the mandrel is then removed. To do this the deposited silica adjacent the tube 16 is fused against the tube and then the mandrel is gently twisted to dislodge it. The mandrel is withdrawn from the soot and a substitute fused silica tube is fused into the open end of the resulting tubular soot preform 21.

The deposited silica has a very high moisture content. This is untenable if the silica is to be incorporated within an optical waveguide since the moisture results in a large absorption peak near 1400 nanometers which affects the transmission at 1300 nanometers which is the output wavelength of long wavelength light emitting devices of interest in fiber optic communications systems.

Figure 3:
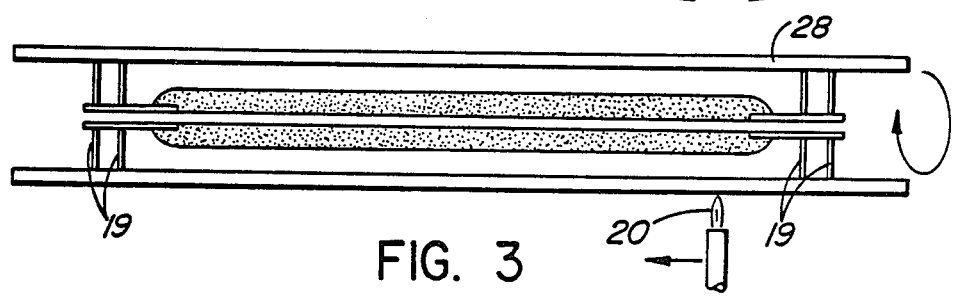

To remove this OH moisture absorption peak, the particulate silica is dried in a chlorine-containing atmosphere at high temperature. As shown in FIG. 3 the preform 21 is mounted within a 16 millimeter internal diameter silica tube 28 using apertured Teflon (Trademark) spacers 19 which permit the silica preform and the tube 28 to be rotated with the preform 21 held centrally in the tube. A mixture of chlorine (200 cubic centimeters per minute) and helium (200 cubic centimeters per minute) is then piped through the tube and a burner flame 20 is directed at the outside of the tube to establish a temperature of 1300 degrees centigrade at a hot zone of the porous tubular silica preform 21. The torch is passed several times along the tube in the direction of flow of the gas mixture. Torch traversal takes place at 8 centimeters per minute for a time of 20 minutes. During this period the porous silica shrinks to about 0.9 centimeters in diameter corresponding to a soot densification from an initial value of about 0.35 grams cm$^{-3}$ to a final amount of about 0.7 grams cm$^{-3}$. Hydrogen contained within the soot as the hydroxyl species reacts with the chlorine to produce hydrogen chloride. Excess chlorine and hydrogen chloride are exhausted from the tube leaving chlorine within the particulate silica. Removal of hydroxyl species renders subsequently formed fused silica very highly transmissive.

In a subsequent sintering or consolidation step, the burner traversal rate is reduced to 0.4 centimeters per minute and the gas applied to the burner is altered to obtain a hot zone temperature above $1600+/-50$ degrees centigrade. After a one hour burner traversal period, the soot is consolidated to a fused silica tube 27 about 30 centimeters in length having an external diameter of 0.65 centimeters.

The inside wall of the tube 27 is then etched to remove graphite particles or other contaminants by passing a mixture of sulphur hexafluoride (4%) and helium (96%) through the tube at a rate of 300 cubic centimeters per minute and a hot zone temperature of 1300 degrees centigrade.

Figure 2:
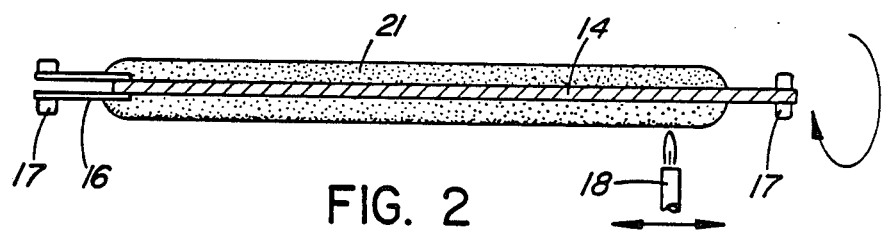
FIGS. 2 to 6 are schematic views of stages in the manufacture of optical waveguide by one method according to the invention.
Figure 4:
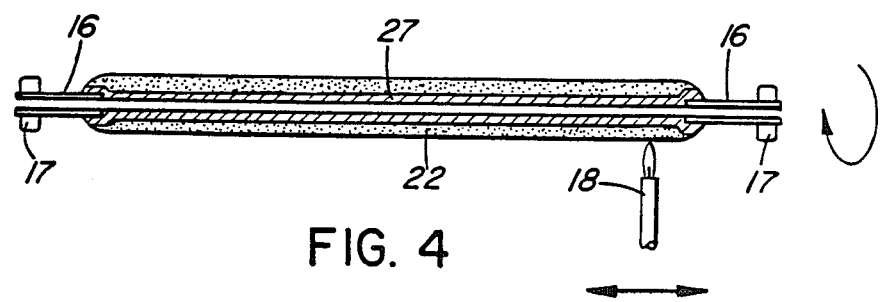

Referring to FIG. 4, the silica tube 27 is mounted between quartz chucks 17 and further silica soot 22 is deposited from a burner 18 similar to that described with reference to FIG. 2. The soot 22 is deposited to a diameter of 2 centimeters with a density of 0.35 grams cm$^{-3}$.

When silica deposition is complete, the silica tube is placed within a fused silica tube 23 having an inside diameter of 2.5 centimeters and a 1 millimeter wall thickness. The tube is mounted between apertured Teflon discs 24 which permit tube rotation. The porous silica 22 is then simultaneously dried and doped with fluorine by passing along the tube 23 a mixture of helium (180 cubic centimeters per minute) and sulphur hexafluoride (45 cubic centimeters per minute). A single burner pass is made in the direction of gas flow at a traversal rate of 0.4 centimeters per minute and a hot zone temperature in the range 1350 to 1400 degrees centigrade. Because of the presence of fluorine in the porous silica, the sintering temperature is much lower than that of pure silica. Consequently the heat pass not only dries and dopes the silica but causes sintering as shown at region 25. A fused silica tube is produced having an external diameter of 1 centimeter. An outer annular region of the tube is doped with fluorine to a level at which the refractive index is 1.4520 compared to 1.4585 of the pure silica in the central region. This refractive index difference, delta n=0.0065 is suitable for making multimode optical waveguide.

Although it is convenient to perform the drying and fluorine doping steps simultaneously, the steps can in fact be performed successively in which case an alternative drying agent such as chlorine can be used. By using the chlorine and fluorine drying techniques at various stages in the fabrication process, a moisture level of less than 0.1 parts per million in the fused silica is achieved.

The diameter of the tube is then increased from about 1 centimeter to about 1.3 centimeters by adding a silica jacket. This can be done by mounting the tube in a lathe as described with reference to FIG. 2 and depositing, drying and collapsing silica soot as described with reference to FIG. 3. Alternatively a fused silica tube can be collapsed down onto the surface of the tube. The enlarged tube finally obtained has a small bore through the center and this is collapsed by heating the tube to a temperature in the range 1850 to 1900 degrees centigrade, and traversing the burner at 1 centimeter per minute towards one end while maintaining a clean helium atmosphere in the bore.

The rod preform obtained is subsequently placed in a vertical orientation drawing tower having a furnace zone at which the preform temperature is raised to about 2000 degrees centigrade which is higher than the silica softening point. Fiber is pulled from the lower end of the preform by a drum onto which the fiber is wound after being cooled and coated with a protective acrylate or silicone layer. The fiber has a high purity silica core and a relatively low refractive index fluorine doped silica cladding.

The waveguide produced using this method is multimode fiber having a core diameter of about 50 microns, a cladding diameter of about 85 microns, and an overall diameter of 125 microns. As previously indicated delta n=approximately 0.007. Monomode fiber in contrast has a smaller core of the order of 9 microns in diameter and delta n=approximately 0.0035. To modify the method for monomode fiber, the core:cladding diameter ratio is reduced. One way of achieving this is merely by depositing more silica soot at the stage described with reference to FIG. 4. Another method is to etch the internal wall bounding the bore through the tubular preform obtained following the sintering step of FIG. 5. Part of the silica initially deposited on the mandrel 14 is then removed using a sulphur fluorine-containing etchant. A delta n of the order of 0.0035 is achieved by doping the porous silica to a lower level by increasing the ratio of helium in the helium:sulphur hexafluoride mixture used during the fluorine drying/doping stage of FIG. 5. The amount of fluorine necessary to lower the refractive index of silica to 1.452 is about the limiting level at which fluorine can be incorporated into silica using this method. To obtain delta n larger than 0.007 for a silica based fiber, the refractive index of the core can be increased above the value of that of the pure silica. Most dopants increase the refractive index of silica, so by incorporation of the dopant material within the silica initially deposited onto the mandrel 14 the refractive index of the resulting waveguide core is increased above that of pure silica. Germanium can be included within the silica initially deposited by entraining germanium tetrachloride with silicon tetrachloride injected into the silica soot producing burner 18.

Figure 7:
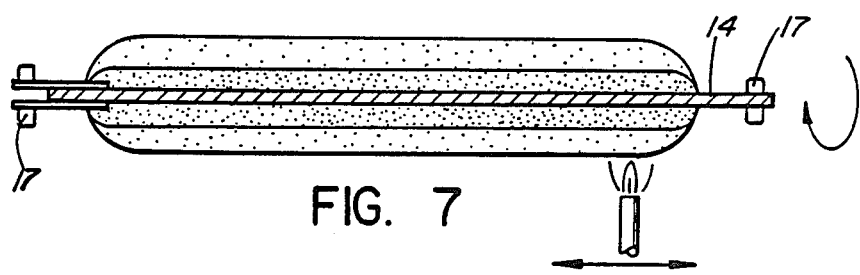
FIG. 7 is a schematic view showing one stage in the manufacture of optical waveguide by another method according to the invention.

One stage in an alternative processing sequence is shown in FIG. 7. As shown in the Figure, a graphite mandrel 14 extends horizontally between two opposed chucks 17 with a burner 18 mounted to direct silica soot at the mandrel surface. In use, an inner preform section 26 is first deposited on the mandrel at a temperature of approximately 1300 degrees centigrade with an oxygen flow rate of 3.5 liters per minute and a hydrogen flow rate of 20 liters per minute. A tapered sleeve (not shown) is placed over the burner nozzle to confine the combustion zone to a small cross-sectional area so that a soot density in excess of 1 gram cm$^{-3}$ results. The deposited silica is then dried in chlorine as previously described with respect to FIG. 3. Subsequently, an outer preform section 27 of particulate silica is deposited on top of the inner preform section at a temperature of approximately 1000 degrees centigrade with oxygen and hydrogen flow rates of 2 liters per minute and 12 liters per minute, respectively. For this deposition, the burner sleeve is removed so as to achieve a less concentrated burner flame and a silica soot density of less than 0.4 gram cm$^{-3}$.

Figure 5:
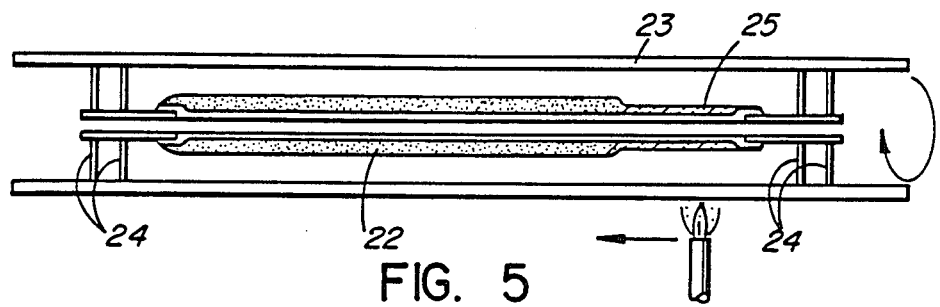
Figure 6:
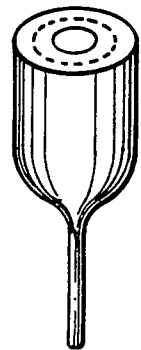

The preform is then subjected to fluorine drying, fluorine diffusion, sintering, collapse and drawing steps as described with reference to FIGS. 5 and 6. As previously indicated the effect of heating within the fluorine atmosphere is firstly to dry the silica and to dope it with fluorine. The fluorine diffuses into the porous preform and the effect of heat is to initiate chemical reactions between the fluorine containing molecule and active sites in the silica network. The density of the active sites appears to be a function of the silica density so that differential fluorine incorporation occurs as a consequence of the differential soot density.

Figure 8:
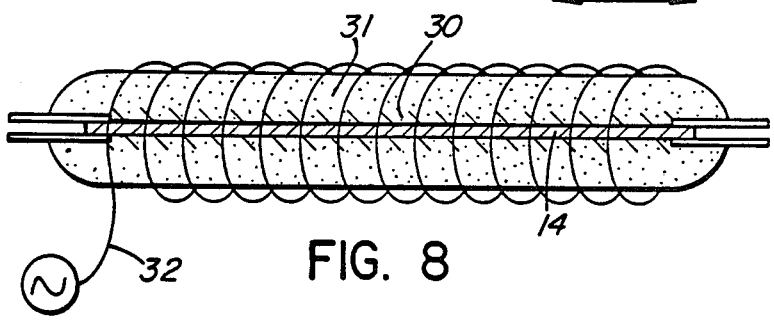
FIG. 8 is a schematic view showing one stage in the manufacture of optical waveguide by a further method according to the invention.

One stage in an alternative processing sequence is shown in FIG. 8. Again silica soot is deposited on the outer surface of a graphite mandrel 14 extending horizontally between opposed chucks 17 of a lathe. Particulate silica is initially deposited onto the mandrel so that an inner preform section 30 has density comparable to an outer preform section 31. Once deposition is complete, the preform is dried in chlorine and then the preform with the mandrel 14 in place is surrounded by an RF heating coil 32. With the mandrel 14 functioning as a susceptor, the heat concentrated near the center of the preform is sufficient to partially fuse the particulate silica in the inner preform section 30 compared to that in the outer preform section 31. The preform is dried in chlorine while the silica is all low density and fluorine is diffused into the outer preform section following densification of the inner preform section 30 by the RF heating and partial fusion.

As an alternative to a mandrel, a glass rod such as a silica rod can be used as the starting member and can be incorporated in the fiber product, the starting rod then becoming a central filament in the core of the finally drawn fiber. If the material of the starting member is not high purity silica then the amount of particulate silica growth should be sufficiently great that the area of the glass starting member in the drawn fiber is negligible. However if the starting member is highly transmissive silica, then the starting rod can occupy a larger proportion of the fiber area.

Figure 9:
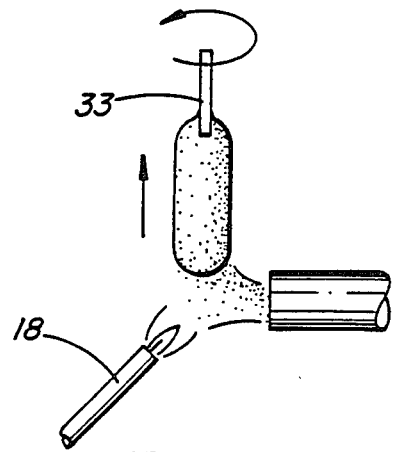
FIG. 9 is a schematic view showing one stage in the manufacture of optical waveguide by yet another method according to the invention.

Indeed, and referring to FIG. 9, if the starting member is a silica rod of very high transmissivity, it can function to provide all of the core glass of the drawn fiber thus obviating one of the particulate silica deposition steps.

Referring to FIG. 9, to form a fused silica rod a small silica seed rod 33 is mounted vertically and is rotated about its axis at about 30 revolutions per minute. Adjacent the seed rod 33 and mounted to direct flame at the lower end of the seed rod is a burner 18 for producing particulate silica. To ensure the formation of a cylindrical rod of substantially uniform diameter, the burner flame is directed angularly at the end of the seed rod 33 and an air flow around the end of the rod is generated using a pipe 32 connected to an exhaust fan (not shown). As particulate silica deposition takes place, the seed rod 33 is progressively raised and is rotated to obtain uniform deposition.

Following the preparation of the particulate silica rod, it is dried in chlorine as described with respect to FIG. 3 and then heated to consolidate it into a fused transparent silica rod. Further particulate silica is deposited on the rod as described with respect to FIG. 4 and the preform obtained is subjected to the fluorine drying, fluorine diffusion, and sintering as described with reference to the embodiment of FIGS. 2 to 6.

Although in the several embodiments of the invention described, the preform and resulting optical waveguide has a pure silica core 10 and a fluorine doped cladding 12, it is possible also to have a doped silica core whereby the refractive index of the core can be altered from that of pure silica. In addition the silica soot which eventually forms the cladding material can be formed by flame hydrolysis of silicon tetrafluoride or a mixture of silicon tetrafluoride and silicon tetrachloride. Using this method, some fluorine is entrained during deposition of particulate silica and is then supplemented during the fluorine diffusion step.

What is claimed is:

1. A method of manufacturing a preform for an optical waveguide comprising:
   depositing a thick layer of particulate silica onto a mandrel;
   drying the particulate silica;
   after the thick layer of particulate silica is deposited, densifying from the inside out an inner region of the thick layer of particulate silica to an extent that gaseous fluorine will not diffuse thereinto while leaving an outer region of the thick layer of particulate silica in a non-densified state so that gaseous fluorine will diffuse thereunto;
   after the inner region of the thick layer of particulate silica is densified, diffusing gaseous fluorine into the outer region of the thick layer of the particulate silica;
   removing the mandrel; and
   consolidating the particulate silica to produce a preform and collapsing the resulting tubular preform to a rod.

2. A method as recited in claim 1 wherein said step of depositing a thick layer of particulate silica comprises depositing said thick layer of particualte silica onto a graphite mandrel, and said step of densifying said inner region comprises heating said inner region by heating said graphite mandrel.

3. A method as recited in claim 2 wherein said step of heating said mandrel comprises surrounding said particulate silica with an RF heating coil to cause said mandrel to act as a susceptor.

4. A method as recited in claim 1 wherein the step of densifying an inner region of the thick layer of particulate silica comprises heating said inner region of the thick layer of particulate by supplying heat from said mandril without heating said outer region by supplying heat from said mandril.

* * * * *